UNITED STATES PATENT OFFICE.

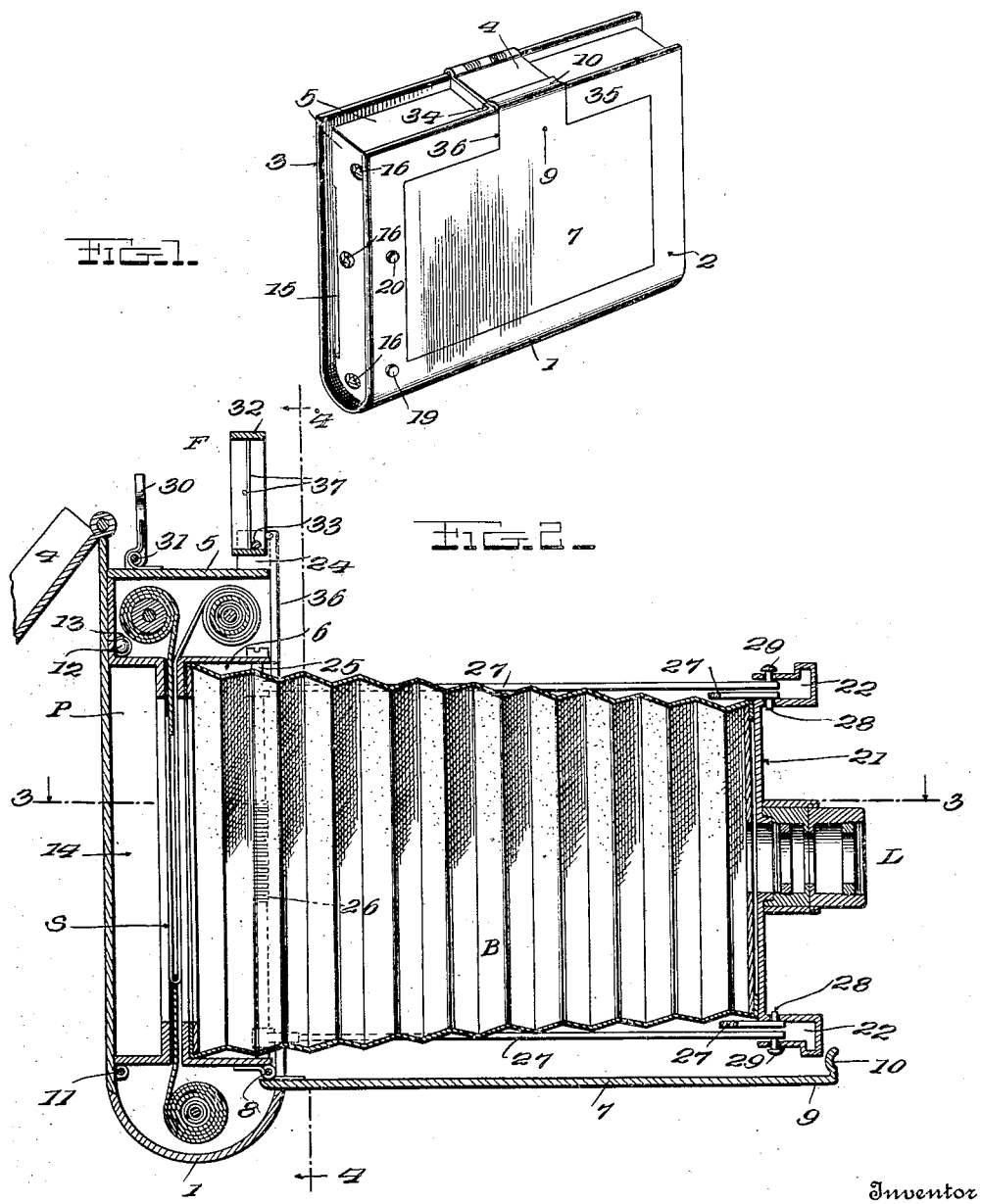

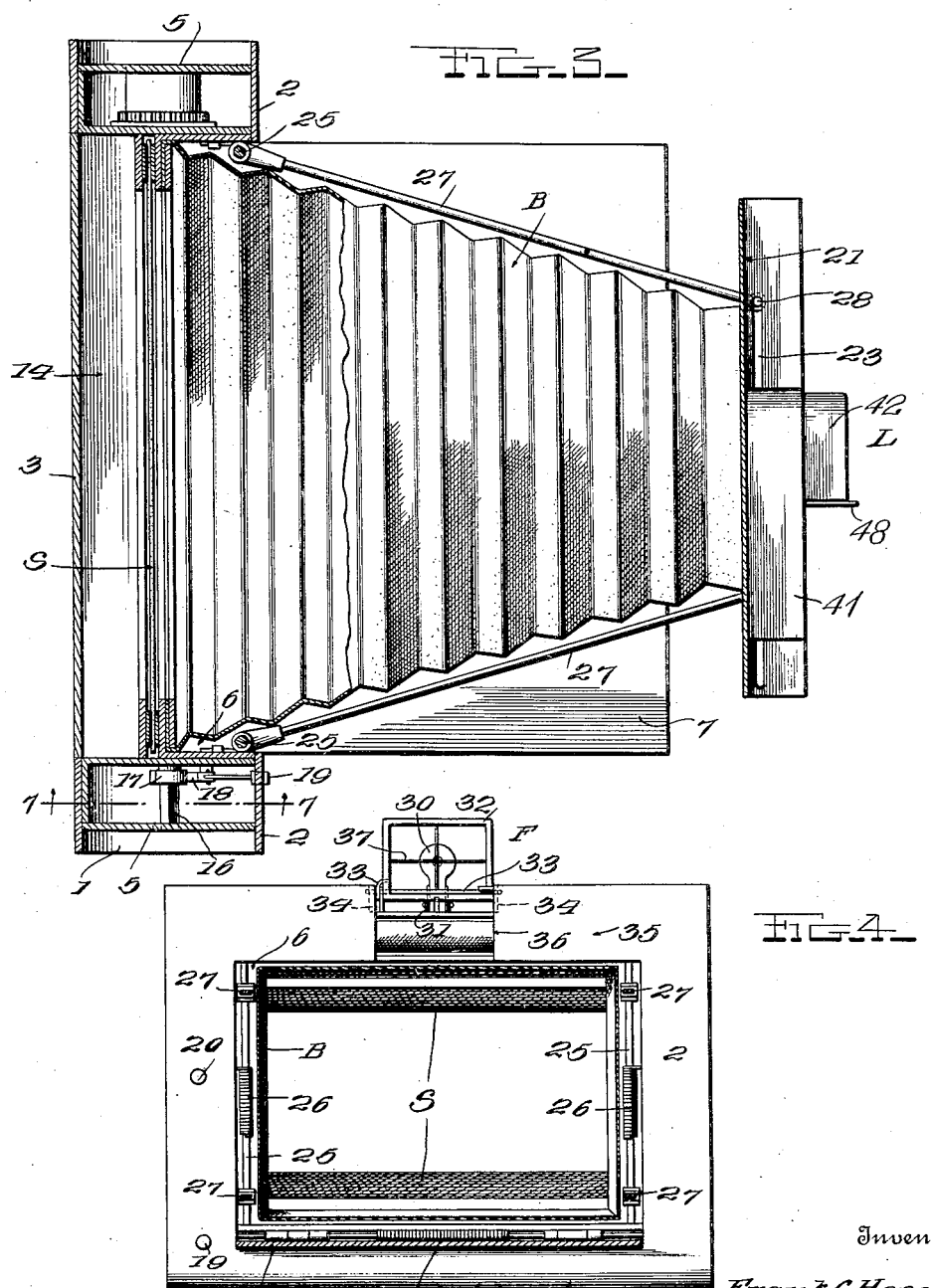

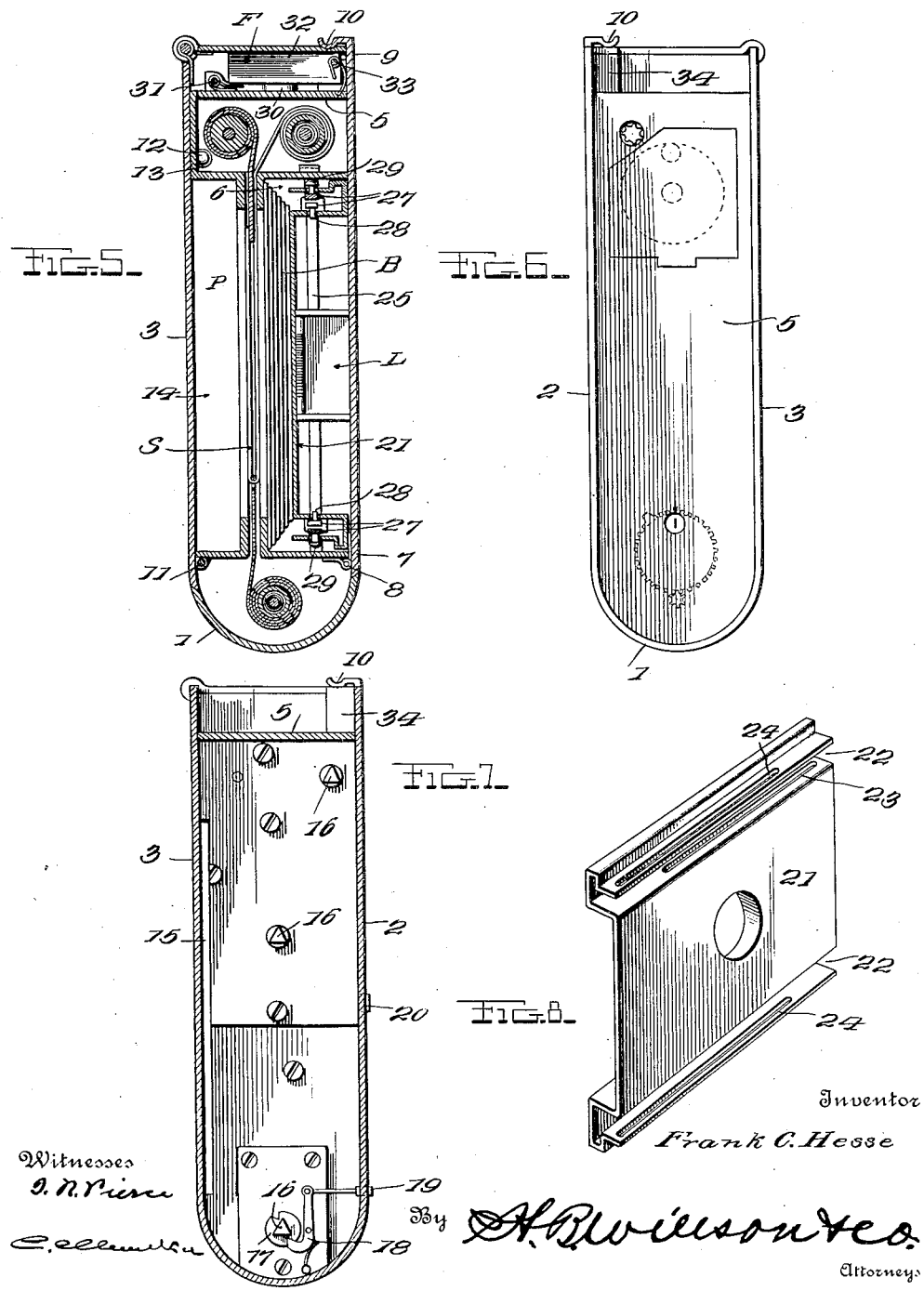

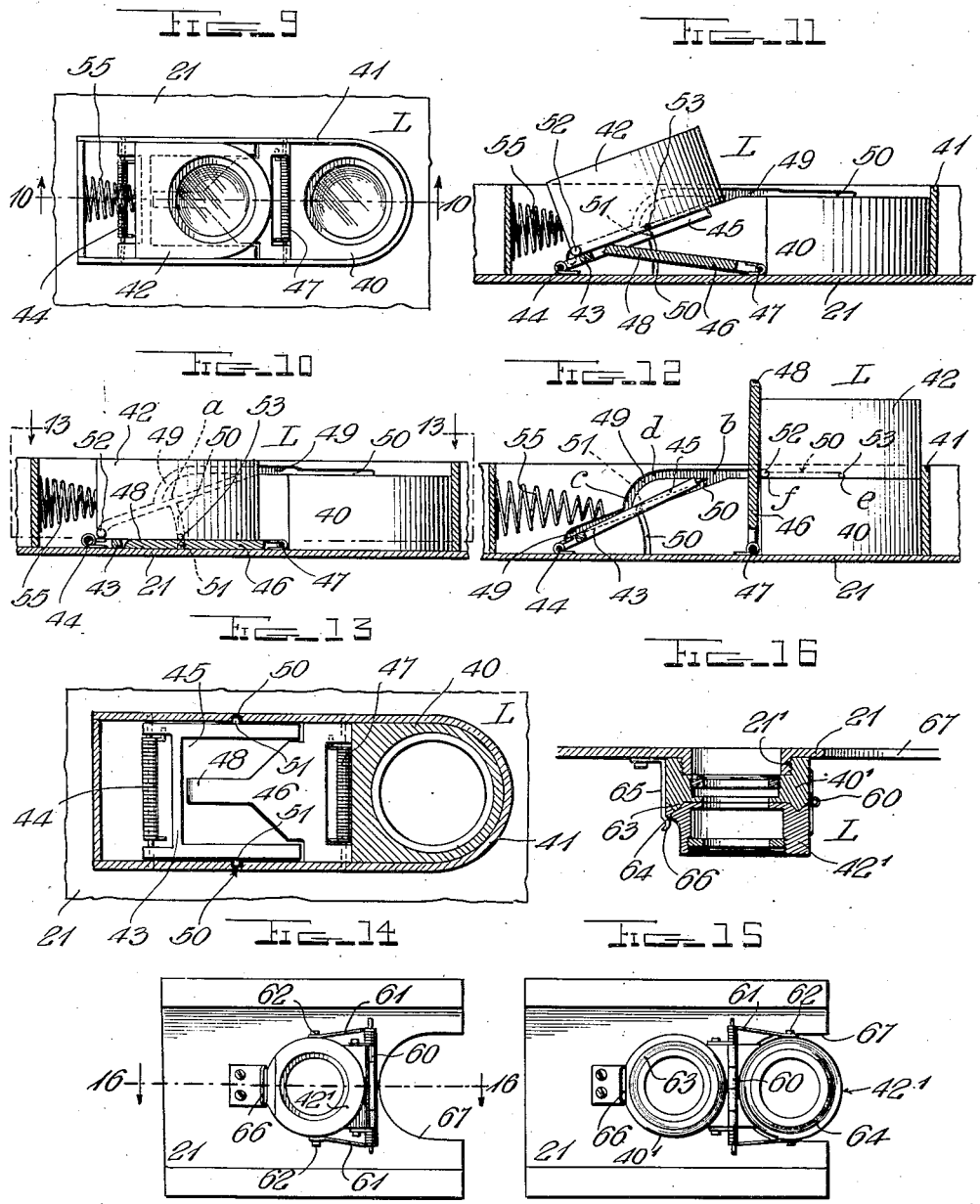

FRANK C. HESSE, OF PORTLAND, OREGON.

FOLDING CAMERA.

1,123,740.   Specification of Letters Patent.   Patented Jan. 5, 1915.

Application filed November 13, 1913. Serial No. 800,836.

*To all whom it may concern:*

Be it known that I, FRANK C. HESSE, a subject of the Emperor of Germany, having declared my intention and filed petition to become a citizen of the United States, residing at Portland, in the county of Multnomah and State of Oregon, have invented certain new and useful Improvements in Folding Cameras; and I do declare the following to be a full, clear, and exact description of the invention, such as will enable others skilled in the art to which it appertains to make and use the same.

This invention relates to photography, and more especially to folding cameras; and the object of the same is to produce an inconspicuous, compact, and fully equipped camera which may be folded into extremely small space in simulation of a book, and yet will take a comparatively large picture when opened.

A further object is to provide means whereby the various folding parts are held in their folded condition in such manner that when released the entire camera flies open ready for instant use, so that a picture may be very quickly taken when occasion arises.

An important feature of the invention is the provision of a two-part lens, or rather lens casing, whereof the parts or members are adapted to lie side by side when the camera is folded and will therefore occupy but little space, but adapted to automatically assume a coactive relation when the camera is unfolded.

Other objects and advantages will appear from the following specification and claims, and as shown in the drawings wherein—

Figure 1 is a perspective view of this improved camera in its folded condition; Fig. 2 is a central vertical longitudinal sectional view on an enlarged scale, showing the camera as opened and ready for use, excepting that the film pack and the lens glasses are omitted; Fig. 3 is a horizontal section taken on about the line 3—3 of Fig. 2, and Fig. 4 is a vertical transverse section on a reduced scale, taken on about the line 4—4 of Fig. 2; Fig. 5 is a central vertical section through the camera with the parts folded, and Fig. 6 is a left end elevation of the camera when so folded. Fig. 7 is a vertical section on about the line 7—7 of Fig. 3, taken when the camera is folded. Fig. 8 is a perspective detail of the front plate of the bellows.

Figs. 9 to 13 are details of that form of my two-part lens which is shown in the preceding figures of the drawings. Fig. 9 is a front elevation of the lens when folded, and Fig. 10 a slightly enlarged section through it in this position, taken on the line 10—10 of Fig. 9. Fig. 11 is a section similar to Fig. 10, showing the first movement of the movable part of the lens toward its final position, and Fig. 12 is a similar view showing said movable part in its final position in alinement with the fixed part of the lens. Fig. 13 is a section through the fixed part of the lens, taken on the line 13—13 of Fig. 10, giving an elevation of the leaves in their folded condition. Fig. 14 is a front elevation of another form of this folding lens with its two parts or members in alinement; Fig. 15 is a similar elevation with the two parts open or out of alinement; and Fig. 16 is a horizontal section taken on about the line 16—16 of Fig. 14.

I may say at starting that no novelty whatever is claimed for the glass lens themselves, bellows, shutter, plate holder or film pack (not shown), or finder, nor for the tripod, focus-adjusting means, or stop if the last-named three elements are used. I have found it necessary to illustrate some of these elements herewith, because with the object of producing a folding camera which will condense into extremely small space it may be necessary to shape the elements and dispose them in such way that they will fold into the casing of the camera, although I lay no claim to novelty in the elements themselves. In most folding cameras now on the market it is necessary to manipulate a number of catches, push buttons, hooks and eyes, and other fastening and unfastening and adjusting means before the camera itself can be opened out ready to take a picture; and in most of such folding cameras it is then necessary to adjust or place the finder, set or focus the lens, and mount or steady the camera frame before an exposure can be made.

In so far as possible I propose to make an extremely compact folding camera which when folded appears like a book as suggested above, but which may be permitted to open automatically and quickly so that all its movable parts fly into position ready to take a picture, and the user has then but to press the proper button and the exposure is made. I have been able to build a working model which is four and three-quarters by six and one-half inches in size and only one and three-eighths inches thick, but which will take a picture two and one-half by four and a quarter inches, and I find a picture of this size is sufficiently large for all ordinary purposes as it can be enlarged if necessary to bring out greater detail. A folding camera of this size will house a high power lens and a focal plane shutter, and has a space at the back for a film pack, so that it will be seen that although the camera is small it contains the latest improvements in photography and is designed to do good work and give satisfaction to its user.

Following out the idea that the folding camera will simulate a book, I would cover it with leather or cloth or make its exterior in imitation of the same, so that when folded the camera at a small distance will indeed give the casual observer the impression that he has seen nothing but a book. Photographers find that they are often excluded from places where they could take important pictures, because guards and door keepers have orders to exclude cameras, but with a little instrument of this character which could be carried in the pocket or under the arm it is quite possible that the photographer could take many pictures that would be impossible to him by the use of a folding camera which was too obviously a camera pure and simple.

The book-shaped casing of this improved camera is of sheet metal, and has a curved back 1 with a flat front "cover" 2 and a flat rear "cover" 3, one of which is framelike as will yet be explained, a finder cover made in simulation of a clasp 4 connecting the upper edges of said covers 2 and 3, and a U-shaped plate 5 ornamented in imitation of the edges and ends of the leaves of a book. The cover plates project at three edges beyond the U-shaped plate 5 as best seen in Figs. 1, 2, and 3, and inside said plate 5 the front cover 2 carries a rectangular housing 6 which is about the size of the opening in said cover plate 2 and which constitutes the frame on which is mounted the mechanism yet to be described.

The front door 7 is mounted along its lower edge on a spring hinge 8 tending normally to throw it outward and into open position, and at its upper edge it carries an extension 9 having a spring lip 10 at its upper extremity adapted to pass over the free edge of the finder cover 4 when the parts are closed together—see Fig. 5. The rear cover 3 is itself mounted on a spring hinge 11 along its lower edge adapted to throw it upward and close against the rear side of the housing 6, and it is held closed by any suitable means such as the spring studs 12 engaging the sockets 13 as seen in Fig. 2. In this position it overlies and closes light-tight a pocket or chamber 14 in which is to be placed the film pack (not shown), and the tabs from the films project through an opening 15 in one end of the U-shaped plate as seen in Fig. 1. Just forward of this pocket the housing 6 carries a focal shutter herein broadly designated by the letter S, and its details of construction form no part of the present invention and need not be amplified.

The film pack occupies about the rear third of the casing, the focal shutter and its guides occupy about the central third thereof, and the bellows B when folded occupy a portion of the forward third thereof, permitting the lens L to underlie the front cover 2 as seen in Fig. 5.

Access to the chamber 14 is gained by opening the rear door 3.

The adjustments of the various rollers and drums of the focal shutter I prefer to control by extending their shafts or trunnions as seen at 16 in Figs. 1 and 7, and applying a key thereto when necessary; and the shaft of the roller which carries the spring is preferably also provided with a notched disk 17 whose notches are normally engaged by a spring-pressed pawl 18 adapted to be tripped by a knob 19 whose head lies flush with the front cover plate 2 but can be pushed inward by the ball of the finger. The entire shutter is released for making an exposure by pressing on the knob 20, which by preference is similarly located in the cover 2 at a little higher point as seen in Fig. 1.

The inner end of the bellows B is mounted within the housing 6, and its outer end is attached to a front plate 21 (best seen in Fig. 8) whose edges are bent forward and then rearward to produce channels 22, each channel having slots 23 and 24 along its inner and outer walls. Mounted in suitable bearings within the housing 6 are two upright rock shafts 25, each turned normally outward by means of a spring as indicated at 26 in Fig. 2, and each shaft carries a pair of arms 27 which are so spaced and of such length that they will fly out the opening exposed by the front door 7 when the latter is opened. The outer ends of one pair of arms have inwardly projecting pins 28 traveling in the slots 23, and the outer ends of the other pair of arms have outwardly projecting headed pins 29 traveling in the other pair of slots 24. The result of this detail of construction is that, with the parts properly assembled and folded as seen in figure 5, when the front door 7 is opened the springs 26 cause the two pairs of arms to fly outward and their pins engaging the slots in the front plate 21 cause the latter to travel out of and away from the casing as far as the length of said slots will permit—the result being that the bellows is automatically and instantaneously distended over the door 7 as seen in Fig. 2.

The finder F may be of any suitable type but is shown as consisting of a lens member 30 mounted on a spring hinge 31 on the upper cross bar of the U-shaped plate 5 (see Fig. 2), and a frame member 32 mounted on a spring hinge 33 through its lower forward corner. The pintle of this hinge extends into ears 34 bent backward from the top cross bar 35 of the frame 2 which is bisected at its center as seen at 36 in figure 4 for this purpose; and when the front door 7 is closed its extension 9 closes the opening 36 as seen in Fig. 1.

The frame member 32 carries cross wires 37 whose point of crossing should stand opposite the focal center of the lens 30 when the camera lens L is directed at the object to be photographed, as well understood with finders of this type. The entire finder is capable of being folded onto the top plate 5 as best seen in figure 5, and the finder cover 4 overlies it and holds these parts closed for the engagement of the lip 10 as seen in Fig. 1. When the front door 7 is opened to permit the extension of the bellows B, the removal of the lip 10 from above the cover 4 permits the latter to fly upward as it will do by reason of the normal tendency of the springs 31 and 33, and these springs turn the lens upward and the frame upward while throwing back the cover 4 as seen in Fig. 2—hence the opening of the front door 7 permits the automatic expansion of the bellows and the automatic rise of the finder ready for instant use.

The lens L is in two parts as best seen on Sheet 4 of the drawings, and each part contains a glass which it will not be necessary to illustrate and describe in this case. I repeat that a stop could be used with one part or the other, as well as an instantaneous or time shutter if it were preferred in place of the focal shutter S above described. No novelty is claimed for these details, and the description which follows refers more to the tube-sections which contain the lens glasses than the other elements if they were used. The inner part or member 40 is mounted upon and connected directly to the front plate 21 and within the curved end of a casing 41 which, as seen in Fig. 10, is a little taller than the thickness of this member. The outer or movable member 42 has an external configuration which duplicates that of the inner member 40 so that when the members are alined as seen in Fig. 12, they will both stand within the curved end of the casing 41 and their glasses will be coaxial, but when the outer member is moved aside and stands nearer the other end of the casing 41 as seen in Fig. 10, the entire thickness of the lens is only that of the height of said casing. As shown in Fig. 5, this is such that the front cover 7 will overlie said wall at the time it overlies the channels 22 of the front plate 21. I have shown on Sheet 4 of the drawings two means of moving the movable member 42 into position over and in alinement with the fixed member 40, and will first describe that illustrated in Figs. 9 to 13 inclusive.

Overlying the front plate 21 and disposed within the casing to one side of the fixed member 40 are two leaves. One of these numbered 43 is mounted at its outer end on a spring hinge 44 tending to cause it to rise, and its body is provided with a large notch as indicated at 45 so that in effect it consists of little more than a pair of fingers projecting toward the fixed lens. The other leaf 46 is mounted at its inner edge on a spring hinge 47 tending to cause it to rise, and its body is of a width to stand within the large notch 45 in the first-named leaf, beyond which said body is continued in a finger 48 for a purpose yet to appear. These two leaves may therefore be folded down into a single plane as indicated in Figs. 10 and 13, and their thickness is such that if the movable lens at this time overlies them it will not project beyond the upper edge of the casing. The inner faces of the side walls of the casing 41 are provided with wide grooves 49 and narrow grooves 50 whose shape and extent is best seen in Figs. 10, 11, and 12, and whose function is that yet to be described; the outer leaf is provided in its side edges with pins 51 engaging certain of said narrow grooves; and the sides of the outer lens member 42 are provided at proper points with large pins 52 mounted in the wide grooves 49, and with small pins 53 mounted in the narrow grooves 50. Beyond the rear end of or outside of the movable lens member 42, a spring 55 is mounted within the casing and exerts a constant tendency to push this member inward, or toward the right in Fig. 11.

With the parts properly assembled as seen in Figs. 9 and 10, the operation of this device will be as follows when the front door 7 is opened and the bellows is projected by the means already set forth: The withdrawal of all restraint overlying the outer lens member 42 permits the latter to be pushed forward (or upward as seen in Fig. 11) by the spring hinge 44 of the outer leaf 43 causing the latter to rise as its pins 51 travel upward in the curved portions of the narrow grooves 50. As the small pins 53 of the member 42 are also in said curved grooves 50, this member rises as shown in Fig. 11 until its small pins strike the point $a$ in Fig. 10. This will occur practically the instant the front plate 21 comes to rest as the pins 28 and 29 reach the limit of the slots 23 and 24. Expansion of the spring 55 will then cause the outer lens member 42 to travel to the right from the position shown in Fig. 11 to that shown in Fig. 12. During this travel it is assisted by the spring in the hinge 47 throwing the finger 48 upward. The small pins 53 now travel from $a$ to $b$ at which time the large pins 52 will have reached the point $c$. As the wide grooves 49 terminate at that point or rather merge into the small grooves 50 and large pins 52 can go no farther in that direction, they rise at the point $c$ and move past the point $d$ in Fig. 12. Meanwhile the small pins pass from the point $b$ to the point $e$, and at this time the large pins have reached the point $f$ and the outer member 42 is directly over the inner member 40 of the lens. The inner leaf 46 is now upright, and the finger 48 at its outer end will not interfere with the action of the lens. It is intended that the strength of the springs and the disposition of parts shall be such that this opening action of the lens will take place automatically as the bellows is shot open when the camera is unlatched. To close the lens in closing the camera the operator pushes the movable member 42 to the left, and its pins return over the course described to the position shown in Fig. 10; then the user pushes the front plate and folds the bellows into the open cover-plate 2, closes the front door 7, having meanwhile folded the finder F and closed down its cover plate 4, and the engagement of the lip 10 over the free edge of said cover 4 holds all parts in position as seen in Fig. 1.

In Figs. 14, 15, and 16 of the drawings is shown another construction of two-part lens which may well be employed in this improved folding camera. Herein the inner lens member 40′ is connected directly with the front plate 21, possibly as by screwing it thereto as at 21′, and the outer lens member 42′ is connected to the inner member by a hinge 60 at one side, this hinge being of the spring type and the arms 61 of the spring being preferably extended alongside the movable member 42′ and connected therewith as at 62. The tendency of this spring hinge is to throw the two members together as seen in Fig. 16, and in order that they may make light-tight connection with each other I provide one with a rib 63 and the other with a groove 64 shaped to conform with the shape of the rib as seen in Fig. 16.

In order to check the inward movement of the outer member 42′ and to prevent jar upon and injury to the glass of the lens, I preferably make use of a spring catch 65 at the side of the fixed member 40′ opposite said hinge, its tip 66 rising past this member and being bent inward so as to frictionally engage the free edge of the movable member 42′ when the latter is thrown to its closed position as seen, and this catch has the additional function of holding the parts in this position until it is desired to close up the camera. In order to make the outer member of as great length as possible, the face plate 21 may be cut out as at 67 so that the movable lens member 42′ folds back into said cut-out as seen in Fig. 15. Here it is held only by the tension of the spring-arms 61, and therefore when the front door 7 of the camera is open and the springs throw the bellows B forward, the inertia of this movable member will carry it around its hinge line 60 to the position shown in Fig. 14 and the catch will hold the lens-members there ready for instant use. This construction may be preferred with some types of lens, and I do not wish to be limited in this respect. If a stop or a focus apparatus were employed, I would by preference mount either in the thick portion 40 or 40′ of the lens, but this detail needs no elaboration. Nor will it be necessary to go further into detail as to the construction, material, and proportions of parts, and in fact, the possibilities of a camera are too well known to need amplification here. As suggested above, however, I have aimed to produce a folding camera which when folded is inconspicuous and compact, but which when it is to be used can be unfolded and its parts become automatically and instantaneously distended ready for instant use when the operator makes exposure, and which camera is not a mere toy, but a highly efficient machine provided with a high power lens and a fast shutter operating directly in front of the film.

What is claimed as new is:

1. In a folding camera, the combination with a box-like casing having an opening in its front plate, a hinged door for closing said opening, a bellows secured at its rear end within said casing and having a front plate at its outer end, and spring-actuated mechanism for distending said bellows when the door is opened; of a two-part lens whereof one member is fixed to the front plate of the bellows and the other member is movably connected with the fixed member and adapted to be thrown into alinement therewith.

2. In a folding camera, the combination with a box-like casing having a hinged rear cover and a frame-like front cover and a top plate beneath the upper edges of said cover plates, a front door hinged along its lower edge within the opening in said frame-like cover and having a lip at its upper end, a finder mounted upon said top plate, a spring for throwing it normally upward, and a cover hinged to the rear cover-plate and adapted to overlie said finder when folded and to be engaged by said lip; of a bellows whose inner end is secured within said casing and whose outer end carries a front plate, spring-actuated means for distending said bellows through the frame-like cover when the front door is opened, and a two-part lens whereof one member is fixed to the front plate of the bellows and the other member is movably connected with the fixed member and adapted to be thrown into alinement therewith.

3. In a folding camera, the combination with a box-like casing having a hinged rear cover and a frame-like front cover and a top plate beneath the upper edges of said cover plates, a front door hinged along its lower edge within the opening in said frame-like cover and having a lip at its upper end, a finder mounted upon said top plate, a spring for throwing it normally upward, and a cover hinged to the rear cover-plate and adapted to overlie said finder when folded and to be engaged by said lip; of a bellows whose inner end is secured within said casing and whose outer end carries a front plate, arms pivotally connected at their inner ends with said casing and movably connected at their outer ends with said front plate, and a lens carried by the latter.

4. In a folding camera, the combination with a box-like casing having a hinged rear cover and a frame-like front cover whose top bar is cut away and bent to the rear in ears, and a top plate beneath the upper edges of said cover plates, a front door hinged along its lower edge within the opening in the front cover and having an extension at its upper edge provided with a lip at its extremity, a finder mounted on a spring hinge whose pintle is pivoted in said ears, the hinge tending to throw the finder normally upward, and a cover pivoted to said rear cover plate and adapted to overlie this finder when the latter is folded and to be engaged by said lip; of a bellows whose inner end is secured within said casing and whose outer end carries a front plate, arms pivotally connected at their inner ends with said casing and movably connected at their outer ends with said front plate, and a lens carried by the latter.

5. In a camera, the combination with a book-shaped casing comprising a curved back, a frame-like front cover, a hinged rear cover, and a U-shaped edge plate disposed between said covers, a housing within said casing and having a film-pack chamber just forward of the rear cover plate, a shutter forward of said chamber, a front door hinged within the opening in the front cover, and means for holding the door closed; of a bellows whose inner end is secured within said housing, whose body is adapted to be folded into the housing forward of said shutter, and whose front end carries a front plate, and a lens mounted on the latter and adapted to be covered by said front door when closed.

6. In a folding camera, the combination with a book-shaped casing having a hinged door in its front cover plate, a housing within said casing having a chamber for a film pack, the rear plate of the casing being hinged to give access to said chamber, a focal shutter disposed within said casing, and actuating mechanism therefor leading to the exterior; of a bellows adapted to be folded behind the front door of the casing, means for distending it when said door is opened, a lens carried on the front plate of said bellows, a folding finder hinged to the edge of said casing, means for throwing it normally into active position, and a finder-cover hinged to the rear cover plate of the casing and adapted to be held closed by said front door when the latter is closed.

7. In a folding camera, the combination with the bellows having a front plate; and a lens in two parts whereof one part is secured to said plate and the other part movably connected with the first part, the second part being movable laterally to the vertical plane of the first part for alinement therewith, means for throwing the movable part into axial alinement with the fixed part, and means for holding the parts in this position.

8. In a folding camera, the combination with the bellows having a front plate, and a lens in two parts whereof one part is carried by said plate and the other part is movably connected with the first part, means for throwing the movable part into axial alinement with the fixed part, and a member carried by said front plate and extending alongside the fixed part and yieldingly engaging the movable part to hold the latter in such position.

9. A lens housing, a two-part lens whereof one member is fixedly mounted within one end of the housing, the side walls thereof having internal grooves, and the other member is movably mounted between said walls and has pins slidably engaging said grooves, the latter being shaped to permit the movement of this member into position in alinement with the fixed member.

10. A lens housing, a two part lens whereof one member is fixedly mounted in said housing, the side of the latter having internal grooves, the other lens member being movably mounted between said walls and having pins slidably engaging said grooves, said grooves being shaped to permit the movement of this member into position in alinement with the fixed member; combined with a leaf beneath said movable member, and yielding means for normally raising said leaf and moving the pins of the movable lens-member along said grooves.

11. The combination with a lens housing, and a lens-member fixed within said housing, the inner faces of the side walls of the housing having inclined grooves leading upward from their remote corners and over the fixed member; of a movable lens-member having laterally projecting pins slidably engaging said grooves, and yielding means tending to slide this member into position in alinement with said fixed member.

12. The combination with a plate, a lens-housing thereon, and a fixed lens-member disposed within the housing, the inner faces of the side walls of said housing having inclined grooves leading upward from their remote corners and over the fixed member; of a movable lens-member having laterally projecting pins slidably engaging said grooves, a spring tending to move this member over the fixed member, a U-shaped leaf hingedly connected with said plate and underlying said movable member, and a second leaf hingedly connected with the plate and lying between the arms of said first-named leaf below said movable member, for the purpose set forth.

In testimony whereof I have hereunto set my hand in presence of two subscribing witnesses.

FRANK C. HESSE.

Witnesses:
 DONALD M. GRAHAM,
 M. COLPITTS.